United States Patent [19]

Ahmed

[11] Patent Number: 5,073,282

[45] Date of Patent: Dec. 17, 1991

[54] ELECTRORHEOLOGICAL FLUIDS

[75] Inventor: Syed M. Ahmed, Wilmington, Del.

[73] Assignee: Hercules Incorporated, Wilmington, Del.

[21] Appl. No.: 341,441

[22] Filed: Apr. 21, 1989

[51] Int. Cl.$^5$ ...................... C10M 169/04; C09K 3/00
[52] U.S. Cl. ........................................ 252/77; 252/73; 252/78.1; 252/79; 252/572; 524/853
[58] Field of Search .................... 252/73, 79, 77, 78.1, 252/75, 76, 572; 524/853

[56] References Cited

U.S. PATENT DOCUMENTS

| | | | |
|---|---|---|---|
| 3,385,793 | 5/1968 | Klass et al. | 252/75 |
| 3,808,169 | 4/1974 | Osmond et al. | 524/853 |
| 3,950,284 | 4/1976 | Fukuda et al. | 524/461 |
| 3,984,339 | 10/1976 | Takeo et al. | 252/74 |
| 4,033,892 | 7/1977 | Stangroom | 252/76 |
| 4,049,604 | 9/1977 | Morehouse, Jr. et al. | 524/533 |
| 4,129,513 | 12/1978 | Stangroom | 252/78.1 |
| 4,315,085 | 2/1982 | Ozari et al. | 525/301 |
| 4,420,596 | 12/1983 | Lochhead et al. | 526/212 |
| 4,427,820 | 1/1984 | Backhouse et al. | 524/504 |
| 4,502,973 | 3/1985 | Stangroom | 252/73 |
| 4,533,695 | 8/1985 | Theodore et al. | 524/504 |
| 4,772,407 | 9/1988 | Carlson | 252/74 |

FOREIGN PATENT DOCUMENTS 171235 2/1986 European Pat. Off. .
1570234 6/1980 United Kingdom .

OTHER PUBLICATIONS

Matsepuro, "Structure Formation in an Electric Field", Royal Aircraft Establishment, Jul. 1983.

Primary Examiner—Paul Lieberman
Assistant Examiner—Christine A. Skane
Attorney, Agent, or Firm—Joanne W. Patterson; Mark Goldberg

[57] ABSTRACT

Disclosed are electrorheological fluids which display improved stability against sedimentation, reduced current density and good electrorheological responses. In the preferred embodiment of this invention, these electrorheological fluids are prepared from monomers which are polymerized by dispersion polymerization in a low conductivity medium which also serves as the dispersion medium for the fluid.

13 Claims, No Drawings

ELECTRORHEOLOGICAL FLUIDS

This invention relates to novel electrorheological fluids which display improved stability against sedimentation, reduce current densities and good electrorheological response.

This invention is particularly concerned with the polymerization of chosen monomers in a low conductivity medium which, in addition to serving as polymerization medium, in most embodiments of the invention also serves as the dispersion medium for the electrorheological fluid. In other instances the monomer may first be dispersion polymerized to the desired particle size, recovered from the polymerization medium, and then dispersed in the dispersion medium. In prior art fluids the monomers are first polymerized, recovered from the polymerization medium as bulk polymer, then ground to the desired size and doped, and finally dispersed in a liquid medium. This invention eliminates the grinding step and offers better control over polymer particle size and particle size distributions in a low conductivity medium.

Electrorheological (ER) fluids have been known for some time to be colloidal dispersions of polymeric particles in a low conductivity continuous medium which show dramatic changes in flow properties when exposed to an electric field. These fluids have been known by a number of other names including electrofluids, electroviscous fluids, electroresponsive fluids, electrorestrictive fluids and jammy fluids. Fluids exhibiting these properties were first referred to as "electroviscous" because of their apparent viscosity changes in the presence of electric fields. Such compositions are now more commonly referred to as "electrorheological" fluids since such properties are better understood in terms of the total rheology of the fluids.

These fluids respond to the influence of an electric potential by showing a very rapid and pronounced increase in bulk viscosity. This phenomena can appear as an increase in apparent viscosity of several or more orders of magnitude. The phenomena is generally completely reversible, with the compositions reverting to their initial (zero-field) viscosity upon removal of the electric field. ER fluids change their characteristics very rapidly when electric fields are applied or released, with typical response times being on the order of milliseconds. The ability of ER fluids to respond rapidly to electrical signals allows devices using ER fluids to replace standard electromechanical elements. This greatly increases the number of repetitions a mechanical device can perform. Therefore, ER fluids offer important advantages in a variety of mechanical systems, particularly those which require a rapid response interface between electronic controls and mechanical devices.

One common application of such fluids is in electromechanical clutches in which the fluid is disposed between the surfaces of two electrically conductive members and an electric potential is applied across the two members. The fluid responds to the application of the electric potential by instantaneously, but reversibly, changing in apparent bulk viscosity and yield stress. In strong fields, the fluid thickness to a solid or semi-solid condition whereby torque can be transmitted between the surfaces of the clutch members. Other applications in which ER fluids can be used include fluid filled engine mounts, high speed valves with no moving parts and the interface between electronic and mechanical parts of a machine.

Typically, an ER fluid consists of four components: vehicle, particulate, polar liquid, and stabilizer(s). The particulate material and polar liquid constitute the dispersed phase of the system, with the vehicle being the continuous phase. Each of the four components mentioned above can be one material or a mixture of more than one material.

The continuous phase or vehicle is usually a nonpolar insulating liquid with a low dielectric constant. Mineral oil, silicone oil and various aliphatic hydrocarbons are good examples of such liquids. The viscosity and the density of the vehicle play an important role in the performance of ER fluids. Stability and zero-field viscosity of ER fluids are highly dependent on these factors.

A variety of materials including starch, silica-gel, and hydrophilic synthetic polymers have been found to be useful as fiend dispersed particles, the surface of which typically contains adsorbed water and surfactant, suspended in a nonpolar dielectric fluid having a permittivity less than that of the particle and a high breakdown strength. Conductivity, permittivity, particle size, and hydrophilicity of the particulate material are variables that may affect the performance of an ER fluid. Particle porosity and adsorbed dopant have also been considered important factors.

The polar liquid component in ER fluids is usually water, however, it may be an alcohol or another liquid. The polar liquid has been described as functioning to make the surface of the particles overly wet and sticky, under the applied electric force to facilitate bridging. It has also been desired as facilitating polarization of the particles under the applied potential to create strong attractive forces between the particles.

Suspension stabilizers such as surface active agents are often used to prevent the particles from coagulating and settling, or to increase the electrorheological response of the fluid, or both. Some researchers reported that stabilizing materials adversely affected electrorheological response, however.

Prior to the instant invention, ER fluids have been made from bulk polymers which were initially pulverized into particles, followed by addition of a polar liquid. These particles were then dispersed in the desired continuous phase liquid which contained stabilizers or surfactants, if desired. This process of making ER fluids is cumbersome and has some inherent disadvantages including difficulty in obtaining particles of the desired size to prepare stable dispersions. Particle sedimentation is a major difficulty which has only been partially resolved in the prior art by matching the density of the particles with the density of the dispersion medium. However, the particles do not generally remain dispersed over a wide range in temperature. Usually, the density of the medium is more sensitive to changes in temperature than is the density of the dispersed polymer, and consequently, phase separation occurs with a change in temperature.

The density matching approach is shown in several patents issued to Stangroom, including U.S. Pat. Nos. 4,033,892; 4,129,513 and 4,502,973 and British Patent 1,570,234, dated June 25, 1980. The basic characteristics of the polymers as particulate materials for ER fluids defined in the Stangroom patents include the following: Particles that are hydrophilic, sufficiently porous to be capable of adsorbing a certain amount of water, and containing ionizable groups enabling the water to acquire an electric charge. In Stangroom's most recent patent cited herein, the polymer was defined by its water absorbency and its density. Stangroom found it to be advantageous to avoid use of particles of polymer which were less than 1 micron in size as it was believed that the smaller size would lead to undesirable zero-field properties in a fluid. Since his approach for making stable ER fluids was to match the density of the dispersed phase with that of the continuous phase, the main criterion used in selection of a continuous phase was density. For this reason, not only single component continuous phases, but also blends of selected liquids were used. It was emphasized that the density matching should be done at the use temperature to avoid instability of the fluids.

This invention addresses many of the disadvantages found in the prior art ER fluids. The size reduction step is not necessary and there is no longer a problem with particle sedimentation. It is not necessary to match the density of the polymer to that of the dispersion media. The prior art polymeric particles reported to give good ER response are generally hydrophilic polymers doped with water. In the prior art, polymers used as particles in an ER fluid system are generally made by a polymerization process and recovered as bulk polymer rather than in the fine particle form. The dispersion polymerization process, which results in a polymeric dispersion of finely divided spherical particles, has not been used for making ER fluids mainly because the hydrophilic monomers are not usually soluble or dispersible in the desired continuous medium. A process which solves these problems is provided by this invention.

SUMMARY OF THE INVENTION

Electrorheological fluids of novel composition have been prepared having improved stability against sedimentation, reduced current density, and good ER response. These fluids consist of dispersions of polymeric particles in dielectric media. The particles are first formed by polymerization in the desired medium with a polymer present to act as a stearic stabilizer. The resulting polymeric particles are usually less than 1 micron in diameter, however, particles ranging from submicron to 10-25 microns in diameter can be made using this process. ER fluids prepared in this manner eliminate the problems associated with particle recovery, drying and subsequent grinding of prior art procedures. Optimal properties are obtained by adjusting the level of polymer in the vehicle and by substituting a lower viscosity continuous phase fluid for the high viscosity medium used during polymerization. The ER response of these particles was good when they were doped with a polar component selected from ethanol, dimethylsulfoxide and N-methylformamide.

DETAILED DESCRIPTION OF THE INVENTION

The polymerization of the monomers of this invention are of the type known as dispersion polymerizations wherein the monomer(s) are completely soluble in the polymerization medium, but the resulting polymers are not. The initial reaction mixture is, therefore, homogeneous. The essential components in this process include the monomer, the initiator, the continuous phase medium and a stabilizer. Crosslinking agents will usually be present.

Among the monomers which may be polymerized to form the hydrophobic particles dispersed in the medium are acrylates such as ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, and n-hexyl methacrylate. Representative higher alkyl acrylic esters are decyl acrylate, isodecyl methacrylate, lauryl acrylate, stearyl acrylate, behencyl acrylate and myristyl acrylate and the corresponding methacrylates. Mixtures of two or three or more long chain acrylic esters may be successfully polymerized with one of the carboxylic monomers. One typical useful class of polymers is the methacrylates where the alkyl group contains 10 to 18 carbon atoms. Other monomers which can be used include styrenes (including alpha-methyl styrene), vinyl acetate, vinyl toluene, vinyl chlorides and acrylonitriles.

The polymers also may be cross-linked with a polyfunctional vinylidene monomer containing at least two terminal $CH_2$ groups, including for example, butadiene, isoprene, divinyl benzene, divinyl naphthalene, acrylates and the like. When the optional cross-linking agent is present, the polymeric mixtures usually contain up to about 5 or more percent by weight of cross-linking monomer based on the total monomer present, and more preferably, about 0.1 to 2.0 weight percent.

The organic liquid used both for polymerization and as the vehicle for the ER fluid in most of the examples herein is mineral oil, a colorless, petroleum liquid product, normally containing a major proportion of liquid aliphatic hydrocarbon materials. The continuous liquid phase can be selected from any one of a large number of electrically insulating hydrophobic liquids in which the monomer selected dissolves. These include transformer oils, transformer insulating fluids, silicone oils, mineral oil, aliphatic hydrocarbons such as paraffin oils, halogenated aromatic liquids and halogenated paraffins, and mixtures thereof. As known to those familiar with such compounds, transformer oils refer to those liquids having characteristics properties of both electrical and thermal insulation. Naturally occurring transformer oils include refined mineral oils which have low viscosity and high chemical stability.

The specific gravity of the mineral oil normally ranges from about 0.76 to about 0.79, with a boiling range from about 150° C. to about 200° C. While the flash point is normally above about 40° C., for safety reasons the flash point should preferably be above about 60° C. A mineral oil having a composition of 0 to less than 5 percent aromatics, about 40 to about 80 percent paraffins and about 15 to about 60 percent naphtha, having a flash point above 60° C. produces good results. The amount of mineral oil used will normally be in excess of the amount of the monomers to be polymerized and while the proportion may vary from at least 1 weight percent of monomers and 99 weight percent mineral oil up to about 50 weight percent monomers and 50 weight percent mineral oil, and more normally a concentration of about 15 to 40 weight percent monomers is employed. More preferably, 15 to 25 weight percent monomers is employed. In the examples that follow the mineral oil had a room temperature viscosity of 90 cp, a density of 0.87 gm/cc and a dielectric constant at 1 kHz of 1.8.

Dispersions in organic media are inherently less stable than those in aqueous systems, thus requiring a stabilizer. The attractive interaction between these particles leads to their rapid coagulation unless a repulsive steric barrier is established at the interface. In preferred embodiments of the invention, a polymeric stabilizer is used for this purpose. Various types of polymeric stabilizers may be employed including homopolymers, and copolymers including random copolymers and block and graft copolymers having one segment being soluble in the polymerization medium and the other having an affinity towards the dispersed phase polymer are generally recommended as stabilizers. Comonomeric surfactants that are soluble in the selected continuous phase for the polymerization can also be used. Selection f stabilizers depends upon the nature of the polymer being formed and the medium of the polymerization. Block copolymers are molecules in which two different types of homopolymer chains are joined end to end. While any number of homopolymer blocks can be joined together, typically only one block of each homopolymer is involved. In the case of a block copolymer stabilizer, one block forms an anchor group which is nominally insoluble in the fluid media and attaches to the particle surface. The other block is soluble in the fluid, will generally be very long and provides the steric stabilization barrier. Graft copolymers are somewhat different. A long polymeric backbone is formed by one of the homopolymers with side chains of the other homopolymer attached at intervals along its length to form a comb-like copolymer structure. In this case the polymer backbone would form the anchor for attaching the molecule to the particle and the side chains would be solvated by the fluid media.

In some systems a homopolymer may serve as a steric stabilizer. A suitable homopolymer is essentially soluble in the fluid but has some functionality with strong affinity for the particle surface. Similarly, a random copolymer can also be used as a steric stabilizer. Typical polymers that can be used as stabilizers include homopolymers such as poly(methyl methacrylate) (PMMA), poly(vinyl acetate) (PVA), poly(12-hydroxystearic acid) (PSA) or poly(lauryl methacrylate) (PLM). The following graft or block copolymers can be employed when the dispersion polymer is poly(methyl methacrylate) or polystyrene: PMMA/PSA, PVA/PSA, PMMA/PLM or styrene-butadiene copolymer. When the dispersion polymer is poly(vinyl acetate), the stabilizing block or graft copolymer may be PVA/PSA or PMMA/PSA.

It has been well established that the particle size and particle size distribution of the polymeric particles produced by dispersion polymerization can be controlled by varying several factors such as monomer, initiator and stabilizer concentrations. Solvency of the polymerization medium and polymerization temperature also have a strong effect on the particle size and the particle size distribution of the resulting polymeric dispersions. It is also known that, for the polymers which are soluble in their own monomers, the unreacted monomer kept the growing radicals in the solution for a much longer period compared to those monomers which do not act as a solvent for the resulting polymers. In such systems, monomer concentration is reported to be very important, not only for the particle size, but also for the stability of the resulting dispersions.

It has been demonstrated in the present invention that the particle size obtained by this type of polymerization can be controlled from 0.1 to 10-15 microns in diameter. However, from a stability point of view, smaller size particles are more desirable. The rate of sedimentation of the dispersed phase particles can be calculated using Stokes' law which shows that the stability against sedimentation is directly dependent upon the square of the particle diameter and the density difference between the particles and the medium and inversely dependent upon the viscosity of the medium. The organic medium used for polymerization is usually not as dense as the dispersed phase polymer, and generally has a lower viscosity. Therefore, the particle size must be smaller to minimize sedimentation during storage.

The following procedure was followed (except when otherwise indicated) in measuring the response of ER fluids produced according to this invention. A Rheometrics System 4 Rheometer (Rheometrics, Inc., Princeton, N.J.) was modified to facilitate the application of an applied electric field and was found to be a quick and reliable way of measuring the response of ER fluids. Accordingly, the fluid option assembly (cup and bob) of the Rheometer was modified to facilitate the application of a DC potential across a 2 mm gap between the cup and bob. The test sample was held between two coaxial cylinders (the cup and bob) having a total surface area of 82.9 $cm^2$. The bob has a radius of 24 mm and is 55 mm in length and is attached to the sensitive transducer which can measure a maximum torque of 100 gm-cm. The cup has an inner radius of 26 mm allowing the 2 mm gap. It is held by a motor that can perform both rotational and oscillatory motions. The electric potential is introduced into the bob by way of a brush device. The torque measurement is not attenuated by the incorporation of the voltage device. An insulator is placed between the transducer shaft and the electrified bob to shield the transducer electronics from the high voltage. The motor shaft and the cup are grounded. A Fluke voltage generator is used as the high voltage source capable of generating a voltage generator is used as the high voltage source capable of generating a maximum voltage of 10,000 V, DC. Ampmeters are used to detect the current. A shield is placed in front of the rheometer to screen high voltage from the operator during a normal run. A standard ER test is the voltage screen experiment. The ER fluid is subjected to oscillatory shear flow at 5 rad/sec and 15% strain initially for 5 minutes. Then a voltage is turned on while the fluid is being sheared. After 15 minutes (or a shorter time, e.g. 2-5 minutes), the voltage is turned off for a several minutes. This process is repeated up to a limit of 2000 V with the voltage increased in each repetition. Also it is specified that experiments be discontinued if a maximum of 2500 micro Amps is drawn by the fluid. In the Tables, included herein, Electric Field is expressed in units of kilovolts per millimeter (KV/mm). The changes in the complex viscosity, storage modulus G' and the loss modulus G" were recorded for the electric fields of varying strength. In the tables, the viscosity is expressed in units of poise.

The ER experiments can be done at different temperatures. Below room temperature, the temperature control bath is used with the coolant being isopropyl alcohol, IPA. An external thermocouple probe immersed as close to the cup as possible is used to monitor the ER fluid temperature. For high temperatures, a Haake bath with silicone oil is used.

Changes in complex viscosity were studied as a function of applied field strength. As expected, the magnitude of the ER effect (change in the complex viscosity) increases with increasing field strength. The fluid behaves like a liquid in the unenergized state. With increased electric field strength the ER fluid goes through a viscoelastic to an elastic solid-like material. Upon termination of the applied potential, the fluid resumes its original liquid behavior.

The first step in preparing the ER fluid is to synthesize polymethylmethacrylate (PMMA) particles in mineral oil according to the procedure in Example 1. The hydrophobic polymeric particles produced according to Example 1 cannot be doped with water but instead were doped with a polar component, such as ethanol, dimethylsulfoxide or N-methylformamide by direct addition to the dispersion with stirring to make the final ER fluid. Good ER response was observed when these particles were doped with one of these polar components at a concentration of from about 8-15 percent based on the polymer weight. For example, a fluid doped with 14% ethanol (based on polymer) at 40% solids shows a 35-fold increase in the viscosity at 1 KV/mm field strength. The current densities at 1 KV/mm were less than 5 micro amps/sq. cm.

This novel method of making ER fluids not only resolves the stability problems but also results in a novel composition of the polymeric particles with added advantages.

EXAMPLE 1

Dispersion Polymerization of Methylmethacrylate

Dispersion polymerization of methylmethacrylate (MMA) in mineral oil was carried out using the ingredients shown in Table 1. This monomer is completely soluble in mineral oil and the resulting polymer is insoluble in this medium. In a typical experiment the stabilizer is first dissolved in mineral oil and charged to a jacketed glass reactor equipped with a stirrer, thermometer, condenser and nitrogen sparging tube and heated to the polymerization temperature (80° C.) while sparging with nitrogen. In a separate beaker, initiator and crosslinking agent (if desired) are added and dissolved in the monomer and then charged to the reactor held at the polymerization temperature. The monomer is then allowed to polymerize for about 16 hours. Addition of cold monomer to the mineral oil mixture brings the temperature down to about 65° C. Once the temperature of the reaction mixture returns to 80° C. in about 5 minutes after addition of monomer, a strong exotherm occurs and the monomer polymerizes adiabatically for a short time with temperatures reaching as high as 140° C. for several minutes. The polymerization reaction is then continued for several hours at 80° C. The conversion to polymer at the end of the exotherm is usually more than 95% and at the end of the run is usually greater than 99.5%. The time for reaching the end product can be shortened by adding additional initiator at the end of the exotherm. The whole process can be completed within two hours. The exothermic rise in temperature can also be controlled by cooling liquid, if desired.

The particle size of the dispersions prepared using the ingredients shown in Table 1 is usually in the range of about 0.5-0.8 micron, with a relatively narrow distribution of particle size.

TABLE 1

| Polymerization Recipe | | |
|---|---|---|
| | | Parts/100 |
| Mineral Oil = | 261 gms (300 ml) | 55.3 |
| Stabilizer Acryloid 956* = | 20 gms | 4.3 |
| Monomer Methylmethacrylate = | 187 gms (200 ml) | 39.7 |
| Benzoyl Peroxide = | 2.5 gms | 0.5 |
| TEGDMA** = | 1.1 gms | 0.2 |
| Total | 471.6 | 100.0 |

*Produced by Rohm and Haas
**Triethylene glycol dimethacrylate (crosslinking agent)

EXAMPLE 2

The stability of the fluids prepared according to this procedure was excellent. No phase separation of the phases was observed over several months of storage time. A small sample of this fluid was tested in a centrifuge for stability at relative centrifugal force of 92 g, 369 g, 830 g and 2310 g. The results of this test are given in Table 2. There was no phase separation after two hours of centrifugation at 92 g, 1 mm separation after 2 hours at 369 g, 2 mm separation at the end of two hours at 830 g and 4 mm separation at the end of 4 hrs. at 2310 g. In these experiments, a complete separation would have resulted in a 30 mm reading.

TABLE 2

| Stability Data | | |
|---|---|---|
| Relative Centrifugal Force | Time | Separation |
| 1 g | Several months | none |
| 92 g | 2 hrs. | none |
| 369 g | ½ hr. | none |
| | 1 hr. | 1 mm |
| | 2 hrs. | 1 mm |
| 830 g | 2 hrs. | 2 mm |
| 2310 g | 2 hrs. | 4 mm |

EXAMPLES 3 and 4

ER performance evaluation of the fluids produced in Example 1 was carried out according to the procedure discussed earlier. Ethanol is the dopant added to these fluids. Tables 3 and 4 summarize the performance data in terms of absolute viscosities as a function of applied field strength, dopant concentration and the concentration of the dispersed phase polymer, for non-crosslinked and crosslinked PMMA based fluids respectively. In Example 3 the polymer is polymethylmethacrylate and in Example 4 the polymer is polymethylmethacrylate crosslinked with divinyl benzene.

TABLE 3

| ER Performance of Ethanol Doped PMMA Based Fluids | | | | | | | |
|---|---|---|---|---|---|---|---|
| | | | | Viscosity (poise) | | | |
| Example | Polymer % | % Ethanol | Field Strength KV/mm | 0 | 0.25 | 0.50 | 0.75 | 1.00 |
| 3A | 40 | 0 | | 4.1 | 5.2 | 5.9 | — | — |
| 3B | 40 | 1.55 | | 4 | 5 | 6.1 | — | — |
| 3C | 40 | 3.06 | | 3.9 | 5 | 6.3 | — | — |
| 3D | 40 | 5.94 | | 6.4 | 27 | 80 | 150 | 22 |
| 3E | 40 | 7.32 | | 5.5 | 36 | 85 | — | 185 |
| 3F | 30 | 4.52 | | 3.6 | 11 | 32 | 61 | 93 |

TABLE 3-continued

| | | | ER Performance of Ethanol Doped PMMA Based Fluids | | | | | |
|---|---|---|---|---|---|---|---|---|
| | Polymer | | Field Strength | Viscosity (poise) | | | | |
| Example | % | % Ethanol | KV/mm | 0 | 0.25 | 0.50 | 0.75 | 1.00 |
| 3G | 20 | 3.06 | | 2.1 | 6 | 20 | 40 | 60 |
| 3H | 10 | 1.55 | | 1.4 | 1.6 | 1.6 | 1.4 | — |

(a) Based on total dispersion.

TABLE 4

| | | | ER Performance of Ethanol Doped Crosslinked PMMA Based Fluids | | | | | |
|---|---|---|---|---|---|---|---|---|
| Example | % | % | Field Strength | Viscosity (poise) | | | | |
| No. | Polymer | EtOH* | KV/mm | 0 | 0.25 | 0.5 | 0.75 | 1.00 |
| 4A | 40 | 0 | | — | — | — | — | — |
| 4B | 40 | 1.55 | | 5.4 | 6.6 | 7.7 | 8.2 | 8.2 |
| 4C | 40 | 3.06 | | 5.5 | 5.3 | 7.8 | 8.7 | 9.0 |
| 4D | 40 | 5.94 | | 6.0 | 30 | 80 | 140 | 215 |
| 4E | 40 | 7.32 | | | | GEL | | |
| 4F | 30 | 4.52 | | 3.1 | 9.5 | 32 | 66 | 100 |
| 4G | 20 | 3.06 | | 2.2 | 5.4 | 18 | 25 | 33 |
| 4H | 10 | 1.55 | | 1.15 | 2.3 | 7.2 | 14 | 12 |

*Based on total dispersion.

The zero-field viscosities of the fluids of Examples 3 and 4 are dependent upon the added alcohol level. In the case of the non-crosslinked polymer, there is no change in the viscosity up to about 8% (based on polymer weight) added alcohol. However, this is followed by a sharp increase in the viscosity up to about 14% of the added alcohol. Further increase in the level of alcohol appears to reduce the viscosity. The zero-field viscosities of the crosslinked PMMA fluids is higher to start with, and with added alcohol the viscosity of the dispersion gradually increases. At over 14% of added alcohol the dispersion becomes a gel.

The ER performance of the two types of fluids is shown in Tables 3 and 4. Both crosslinked and uncrosslinked PMMA fluids showed negligible response up to about 8% added alcohol. Good ER response was observed when the alcohol level was increased above 8%. At the optimum alcohol level (about 14% based on polymer) an increase of about 35-fold in the viscosity levels was observed in both fluids at a field strength of 1 KV/mm.

In general, the ER response increased with increasing polymer concentration. This can be seen in Tables 3 and 4 by comparing those examples with a fixed dopant level of 13.4% ethanol based on polymer. There was one exception seen in the data where the change in the relative viscosity of the 20% non-crosslinked PMMA-containing fluid was about the same or slightly higher than that of the 30% fluid.

It was also seen that the current drawn through these fluids up to a 1 KV/mm field strength were extremely low, i.e. less than 5 micro amps/sq. cm.

EXAMPLE 5

Several other liquids were tested as dopants with the ER fluids prepared in Example 1 at concentrations between 8 and 10% based on polymer. Dimethyl sulfoxide, formamide, N-methylformamide and N,N-dimethylformamide were tested. Of these liquids, only dimethylsulfoxide and N-methylformamide showed good ER response. These results are shown in Table 5.

TABLE 5

| | | ER Performance of PMMA Based Fluid Doped With Various Polar Liquids | | | | | | | |
|---|---|---|---|---|---|---|---|---|---|
| | % | | | Field Strength | Viscosity (Poise) | | | | |
| Example No. | Polymer | Dopant | % BOPMMA* | KV/mm | 0 | 0.25 | 0.50 | 0.75 | 1.00 |
| 5A | 40 | Dimethyl sulfoxide | 9.91 | | 3.5 | 18.5 | 67.3 | 150.8 | 130 |
| 5B | 40 | N-methyl formamide | 9.12 | | 1.7 | 10.5 | 40 | 75 | 112 |
| 5C | 40 | N,N-dimethyl formamide | 8.68 | | 1.5 | 2.1 | 2.7 | 3 | 3.2 |
| 5D | 40 | Formamide | 10.15 | | 1.1 | 1.5 | 2.4 | 3.9 | 5.7 |

*Based on concentration of PMMA

What I claim:

1. An electrorheological fluid consisting essentially of a dispersion of solid hydrophobic polymer particles containing a polar liquid selected from the group consisting of dimethylsulfoxide and N-methylformamide in an electrically insulating fluid containing a steric stabilizer polymer that has an affinity for the hydrophobic polymer particles, said hydrophobic polymer being selected from the group consisting of acrylate, methacrylate, styrene, vinyl acetate, vinyl chloride and acrylonitrile polymers and said steric stabilizer being selected from the group consisting of homopolymers and copolymers of methyl methacrylate, vinyl acetate, 12-hydroxystearic acid and lauryl methacrylate.

2. The electrorheological fluid of claim 1, wherein the steric stabilizer polymer is a copolymer selected from the group consisting of random copolymers, block copolymers and graft copolymers in which one segment of the copolymer is solute in the electrically insulating liquid and a second segment of the copolymer has an affinity to the hydrophobic polymer particles containing the polar liquid.

3. The electrorheological fluid of claim 1 wherein said electrically insulating liquid is a hydrophobic liquid selected from the group consisting of mineral oils, silicone oils, halogenated aromatic liquids and halogenated paraffins and mixtures thereof.

4. The electrorheological fluid of claim 1 wherein said hydrophobic polymer is selected from the group consisting of ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, decyl acrylate, isodecyl methacrylate, lauryl acrylate, stearyl acrylate, behenyl acrylate, myristyl acrylate, styrene, alpha-methyl styrene and vinyl toluene polymers.

5. The electrorheological fluid of claim 4 wherein said hydrophobic polymer is a methyl methacrylate polymer.

6. The electrorheological fluid of claim 4 wherein said hydrophobic polymer is a styrene polymer.

7. The electrorheological fluid of claim 1 wherein said hydrophobic polymer comprises particles having a diameter in the range from about 0.1 micron to about 10 microns.

8. A method for preparing an electrorheological fluid comprising (1) dissolving a monomer in an electrically insulating fluid containing a steric stabilizer polymer having an affinity for hydrophobic polymer particles, (2) polymerizing the monomer in the electrically insulating fluid to form a dispersion of solid hydrophobic polymer particles in the fluid and (3) adding a polar liquid selected from the group consisting of ethanol, dimethylsulfoxide and N-methylformamide to form hydrophobic polymer particles containing the polar liquid, said monomer being selected from the group consisting of acrylates, styrenes, vinyl acetate, vinyl chlorides and acrylonitriles and said steric stabilizer being selected from homopolymers and copolymers of methyl methacrylate, vinyl acetate, 12-hydroxystearic acid and lauryl methacrylate.

9. The method of claim 8, wherein the steric stabilizer polymer is a copolymer selected from the group consisting of random copolymers, block copolymers and graft copolymers in which one segment of the copolymer is soluble in the electrically insulating liquid and a second segment of the copolymer has an affinity to the hydrophobic polymer particles containing the polar liquid.

10. The method of claim 8 wherein said electrically insulating liquid is a hydrophobic liquid selected from the group consisting of mineral oil, silicone oils, halogenated aromatic liquids and halogenated paraffins and mixtures thereof.

11. The method of claim 8 wherein said monomer is selected from the group consisting of dimethyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, decyl acrylate, isodecyl methacrylate, lauryl acrylate, stearyl acrylate, benhenyl acrylate, myristyl acrylate, styrene, alpha-methylstyrene and vinyl toluene.

12. The method of claim 8 wherein said hydrophobic polymer comprises particles that are from less than 1 micron in diameter to 25 microns in diameter.

13. The method of claim 8 wherein the concentration of said polar liquid is from 8% to about 15% by weight of the hydrophobic polymer.

* * * * *

UNITED STATES PATENT AND TRADEMARK OFFICE
CERTIFICATE OF CORRECTION

PATENT NO. : 5,073,282

DATED : December 17, 1991

INVENTOR(S) : Syed M. Ahmed

It is certified that error appears in the above-identified patent and that said Letters Patent is hereby corrected as shown below:

Col. 4, line 15, "polymers" should read --copolymers--;

Col. 5, line 13, "f" should read --of--;

Col. 5, line 58, "kept" should read --keeps--; and

In the claims, Col. 10, line 63, "solute" should read --soluble--.

Signed and Sealed this

Thirtieth Day of March, 1993

*Attest:*

STEPHEN G. KUNIN

*Attesting Officer*  *Acting Commissioner of Patents and Trademarks*